United States Patent
McNaughton et al.

(10) Patent No.: US 12,101,017 B2
(45) Date of Patent: Sep. 24, 2024

(54) COOLANT FLUID SPRAYER ASSEMBLY FOR ELECTRIC MOTOR

(71) Applicant: Rivian IP Holdings, LLC, Plymouth, MI (US)

(72) Inventors: David S. McNaughton, Rolling Hills Estates, CA (US); Dang Dinh Dang, Garden Grove, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 496 days.

(21) Appl. No.: 17/463,155

(22) Filed: Aug. 31, 2021

(65) Prior Publication Data
US 2023/0062470 A1   Mar. 2, 2023

(51) Int. Cl.
| | |
|---|---|
| *H02K 9/193* | (2006.01) |
| *B05B 1/20* | (2006.01) |
| *B05B 15/658* | (2018.01) |
| *H02K 9/19* | (2006.01) |
| *B60K 1/00* | (2006.01) |
| *B60K 11/00* | (2006.01) |

(52) U.S. Cl.
CPC ............. *H02K 9/193* (2013.01); *B05B 1/20* (2013.01); *B05B 15/658* (2018.02); *B60K 1/00* (2013.01); *B60K 2001/006* (2013.01); *B60K 11/00* (2013.01); *H02K 9/19* (2013.01)

(58) Field of Classification Search
CPC ............ H02K 9/19; H02K 9/193; H02K 1/20; H02K 3/24
See application file for complete search history.

(56) References Cited

U.S. PATENT DOCUMENTS

| | | | |
|---|---|---|---|
| 5,718,302 A | 2/1998 | Hasebe et al. | |
| 9,306,433 B2 * | 4/2016 | Sten | H02K 9/193 |
| 10,550,892 B2 * | 2/2020 | Kirkley, Jr. | H02K 5/1732 |
| 2002/0130565 A1 * | 9/2002 | Tilton | H02K 9/20 |
| | | | 310/58 |
| 2008/0136271 A1 * | 6/2008 | Alfermann | H02K 1/20 |
| | | | 310/59 |
| 2014/0117795 A1 * | 5/2014 | Dedrich | H02K 9/19 |
| | | | 310/54 |
| 2020/0204044 A1 * | 6/2020 | Lee | H02K 1/20 |

OTHER PUBLICATIONS

Davin et al., Applied Thermal Engineering, Experimental study of oil cooling systems for electric motors, vol. 75, Jan. 22, 2015, pp. 1-14.
Nov. 22, 2022 Office Action issued in corresponding DE Application No. 10 2022 201 444.8.

* cited by examiner

Primary Examiner — Gary A Nash
(74) Attorney, Agent, or Firm — BAKERHOSTETLER

(57) ABSTRACT

Various disclosed embodiments include illustrative sprayer assemblies, electric motor assemblies, and vehicles with cooling assemblies for stator windings of electric motors. An illustrative sprayer assembly includes a first spray device assembly configured to receive a fluid and further configured to spray the fluid therefrom. A second spray device assembly is configured to receive the fluid and is further configured to spray the fluid therefrom. A connecting tube is fluidly couplable to the first spray device assembly and the second spray device assembly and is configured to provide the fluid from the first spray device assembly to the second spray device assembly.

19 Claims, 8 Drawing Sheets

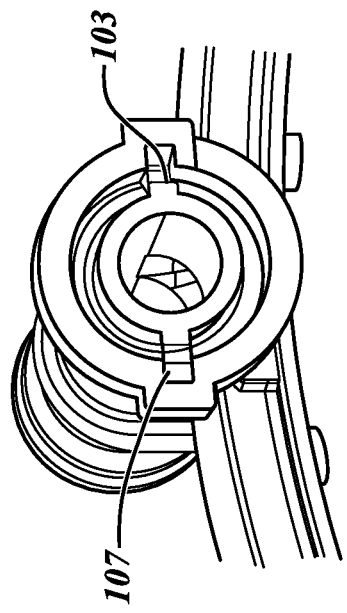
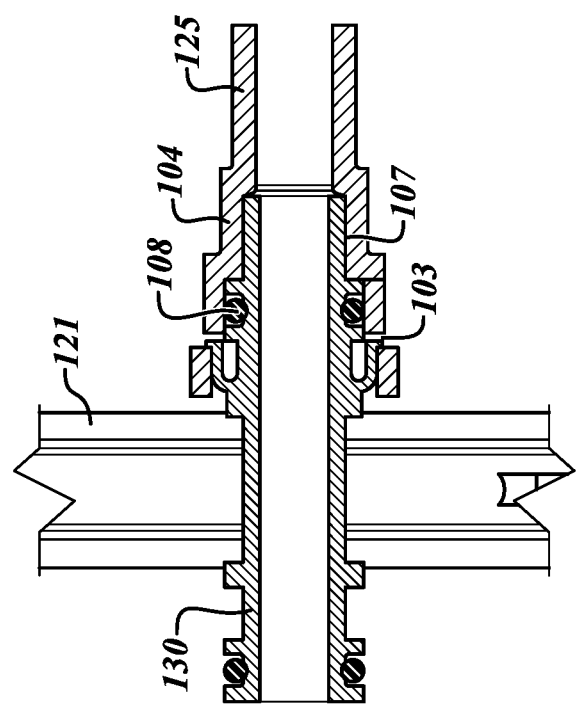
FIG.5B
FIG.5A

COOLANT FLUID SPRAYER ASSEMBLY FOR ELECTRIC MOTOR

INTRODUCTION

The present disclosure relates to cooling electric motors.

The statements in this section merely provide background information related to the present disclosure and may not constitute prior art.

When an electric motor is in operation, significant heat may be generated by electrical current flowing through stator windings due to ohmic loss of copper magnet wires. With inadequate cooling, temperatures may rise beyond allowable limits, thereby possibly affecting various components throughout the electric motor. Prolonged and increasingly high temperatures in the stator windings may contribute to reducing life of dielectric insulation of copper magnet wires, thereby possibly leading to reduced performance and potential winding shorts.

BRIEF SUMMARY

Various disclosed embodiments include illustrative sprayer assemblies, electric motor assemblies, and vehicles with cooling assemblies for stator windings of electric motors.

In an illustrative embodiment, a sprayer assembly includes a first spray device assembly configured to receive a fluid and further configured to spray the fluid therefrom. A second spray device assembly is configured to receive the fluid and is further configured to spray the fluid therefrom. A connecting tube is fluidly couplable to the first spray device assembly and the second spray device assembly and is configured to provide the fluid from the first spray device assembly to the second spray device assembly.

In another illustrative embodiment, an electric motor assembly includes a housing. An electric motor is disposed in the housing. The electric motor includes a stator that has exposed end windings and a rotor configured to rotate relative to the stator. A sprayer assembly is disposed in the housing and is configured to spray fluid onto the exposed end windings of the stator.

In another illustrative embodiment, a vehicle includes at least one drive member. At least one propulsion device is coupled to the at least one drive member. At least one electric motor assembly includes a housing. An electric motor is disposed in the housing. The electric motor includes a stator having exposed end windings and a rotor configured to rotate relative to the stator. The rotor is coupled to the at least one drive member. A sprayer assembly is configured spray fluid onto the exposed end windings of the stator.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Illustrative embodiments are illustrated in referenced figures of the drawings. It is intended that the embodiments and figures disclosed herein are to be considered illustrative rather than restrictive.

FIG. 5A is a cross-sectional plan view of a snap feature of the sprayer assembly of FIG. 1.

FIG. 5B is a perspective view of details of the snap feature of FIG. 5A.

Like reference symbols in the various drawings generally indicate like elements.

DETAILED DESCRIPTION

Figure 1:
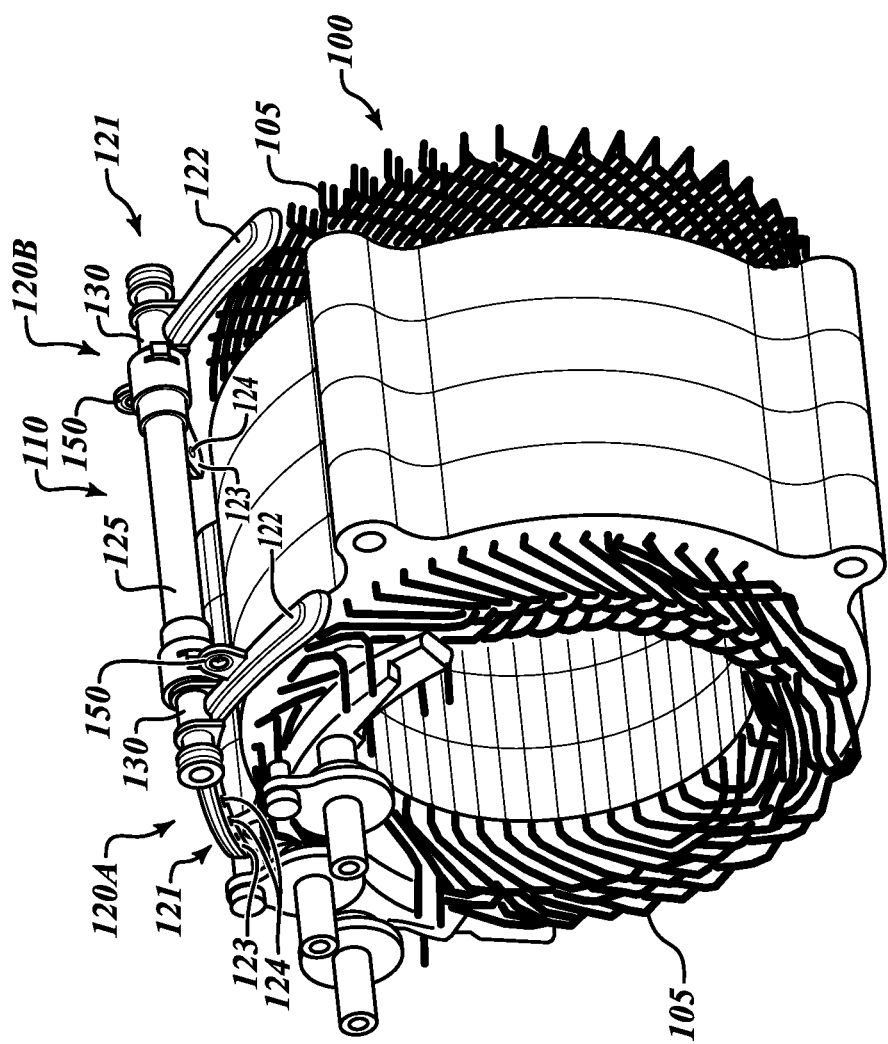
FIG. 1 is a perspective view of an illustrative stator and an illustrative sprayer assembly.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Various disclosed embodiments include illustrative sprayer assemblies, electric motor assemblies, and vehicles with cooling assemblies for stator windings of electric motors. Given by way of non-limiting overview and referring to FIG. 1, in various embodiments an illustrative sprayer assembly 110 includes a spray device assembly 120A configured to receive a fluid and further configured to spray the fluid therefrom. A spray device assembly 120B is configured to receive the fluid and is further configured to spray the fluid therefrom. A connecting tube 125 is fluidly couplable to the spray device assembly 120A and the spray device assembly 120B and is configured to provide the fluid from the spray device assembly 120A to the spray device assembly 120B.

Still by way of non-limiting overview, it will be appreciated that various disclosed embodiments are configured to spray fluid, such as a cooling fluid like an electric motor lubricant such as oil or dielectric fluid or the like, onto exposed end-windings of a stator of an electrical motor, thereby cooling the stator. It will be appreciated that cooling the stator can help contribute to reducing likelihood that motor performance may become thermally limited. It will be appreciated that in various disclosed embodiments, cooling fluid spray can help contribute to improving cooling fluid penetration through multiple winding layers of a stator. It will also be appreciated that various disclosed embodiments can extract heat from motor end windings, thereby helping contribute to attaining an increased continuous torque rating (which is achieved through reduced heat). It will also be appreciated that various disclosed embodiments can also help contribute to providing reduced heat degradation of enamel, varnish, and dielectric insulation of the end windings through distribution of cooling fluid by the spray device assemblies 120A and 120B.

Now that a non-limiting overview has been given, details will be set forth by way of non-limiting examples given by way of illustration only and not of limitation.

Still referring to FIG. 1, in various embodiments the sprayer assembly 110 is configured to spray (or shower) fluid, such as a cooling fluid like an electric motor lubricant such as oil (like a base petroleum) or dielectric fluid (made from one or more low viscosity, high purity synthetic oils) or the like, over exposed end windings 105 of a stator 100 to provide direct cooling to the stator 100. The sprayer assembly 110 includes the spray device assemblies 120A and 120B and the connecting tube 125 configured to connect the spray device assemblies 120A and 120B. In various embodiments each of the spray device assemblies 120A and 120B is configured to spray the fluid therefrom. As will be described below, in various embodiments each of the spray device assemblies 120A and 120B includes a spray device 121 configured to spray the fluid therefrom as indicated by arrows 164.

Figure 2:
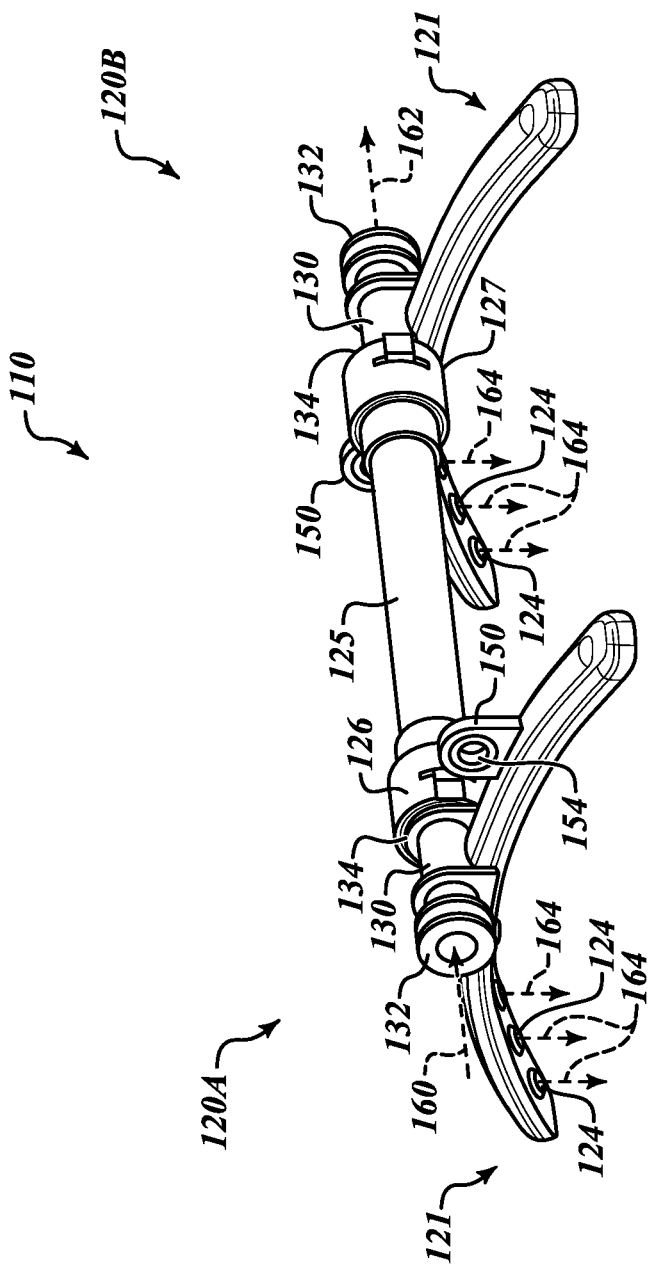
FIG. 2 is a perspective view of the sprayer assembly of FIG. 1.
Figure 3:
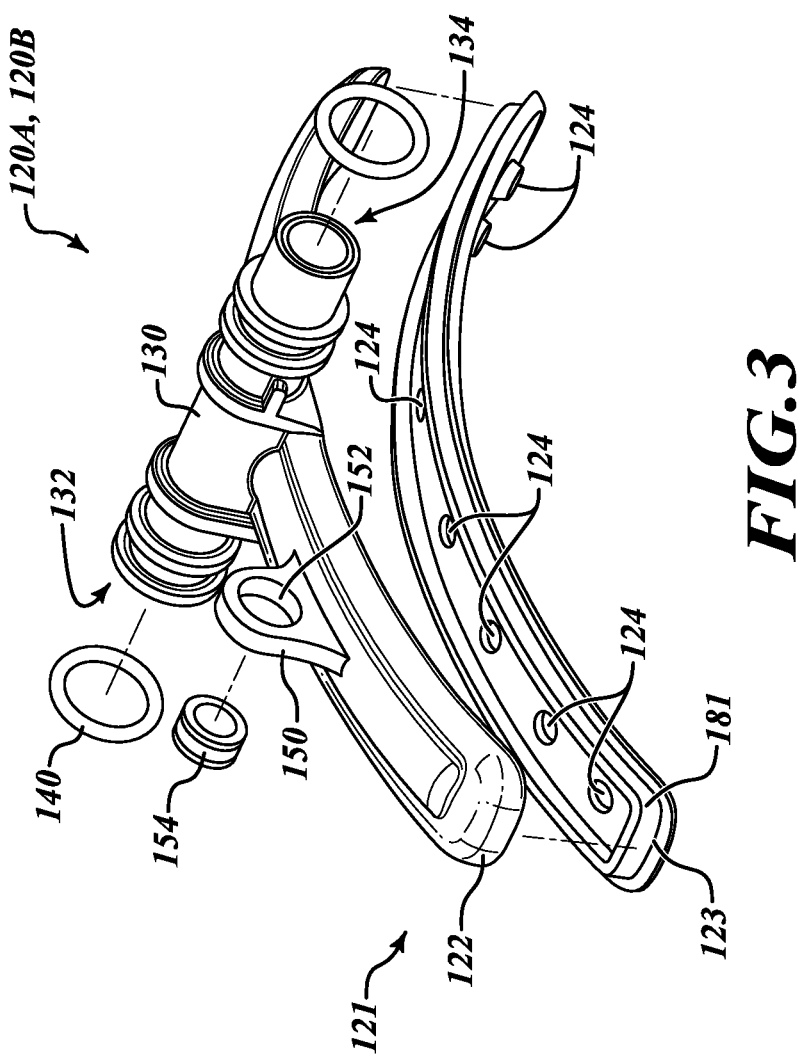
FIG. 3 is an exploded perspective view of an illustrative spray device assembly of the sprayer assembly of FIG. 1.

Referring additionally to FIGS. 2 and 3, in various embodiments each of the spray device assemblies 120A and 120B includes a tube 130 defining an external connection port 132 and a connecting tube connection port 134. The spray device 121 is fluidly coupled to the tube 130 between the external connection port 132 and the connecting tube connection port 134. As illustrated, in various embodiments a center axis of the tube 130 may extend in a direction parallel to an axial center of the stator 100, and may be shared with center axes of the external connection port 132 and/or the connecting tube connection port 134. Further, as illustrated, in various embodiments the spray device 121 may be formed to have a curve having a radius substantially about the axial center of the stator 100.

In various embodiments and as shown in FIG. 2, the connecting tube 125 has an end 126 and an end 127. The end 126 of the connecting tube 125 is coupled to the connecting tube connection port 134 of the tube 130 of the spray device 121 of the spray device assembly 120A. The end 127 of the connecting tube 125 is coupled to the external connection port 132 of the tube 130 of the spray device 121 of the spray device assembly 120B.

In various embodiments and as shown in FIG. 2, the external connection port 132 of the spray device assembly 120A is fluidly coupled to receive fluid from a fluid source (not shown) as indicated by an arrow 160. In some embodiments in which fluid is not provided from the sprayer assembly 110 for any further cooling applications, the external connection port 132 of the spray device assembly 120B is suitably sealed such as, for example, by molding. If desired, in some other embodiments the external connection port 132 of the spray device assembly 120B may be fluidly coupled to provide fluid to, for example, the external connection port 132 of the spray device assembly 120A of another sprayer assembly 110 (not shown) or to any cooling assembly or device as desired as indicated by an arrow 162. In such embodiments, the external connection port 132 of the spray device assembly 120B and the spray device assembly 120A of another sprayer assembly 110 (not shown) may be fluidly coupled to suitable piping, tubing, fluid flow channels, or the like (not shown for purposes of clarity), joined by press fit or snap-fit by force in a direction along the axis of the connecting tube 125, and sealed against possible leakage by an O-ring 140 (FIG. 3).

Given by way of non-limiting example, the spray device 121 defines spray holes 124 configured to spray the fluid therefrom. As shown in FIG. 1, in various embodiments the spray devices 121 have a wide enclosed angle to maximize coverage of the exposed end windings 105. In some such embodiments, wide angle coverage of the spray devices 121 can help target larger exposed copper winding areas. In various embodiments, the spray devices 121 may be configured to spray downward (that is, in a direction opposite the spray devices 121 about the axial center of the stator 100) or inward (that is, toward the axial center of the stator 100) in order to cool the exposed end windings 105 and/or other portions of windings of the stator 100.

Figure 4:
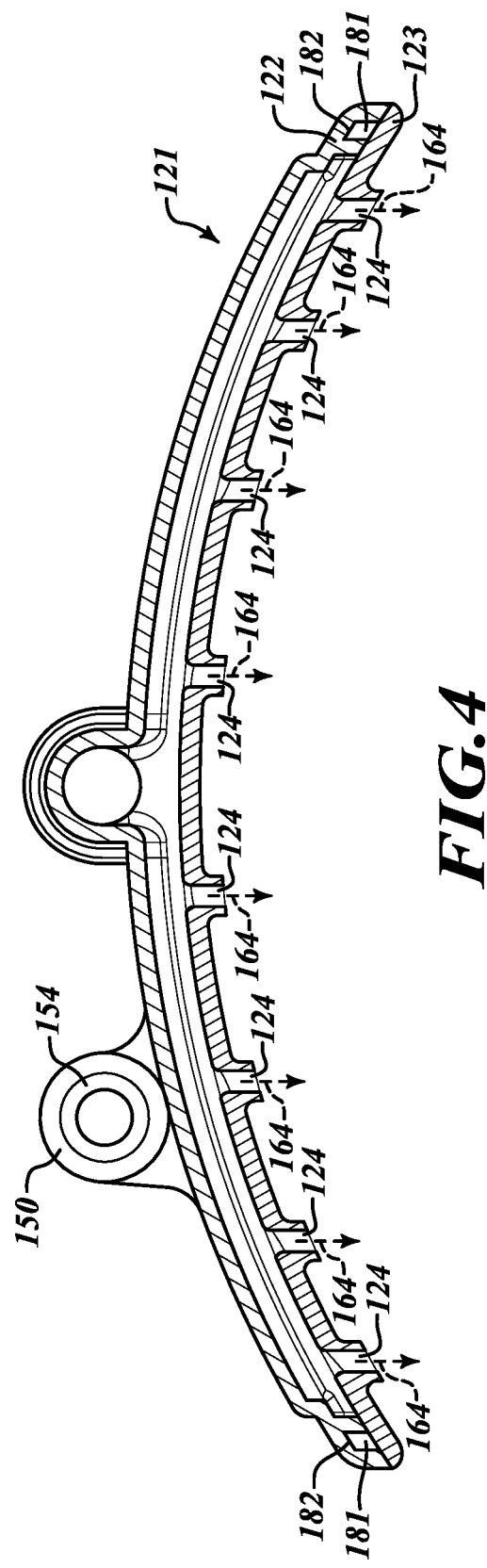
FIG. 4 is cross-sectional plan view of the spray device assembly of FIG. 3.

Referring additionally to FIG. 4 and as mentioned above, in various embodiments the spray device 121 is configured to spray the fluid therefrom as indicated by arrows 164. In various embodiments the spray device 121 defines spray holes 124 therein. In various embodiments the spray holes 124 may be defined by any suitable process, such as, without limitation, laser cutting, water jet cutting, drilling, forming in molding, or the like. It will be appreciated that laser cutting can help provide increased control over size and form of the spray holes 124.

In some embodiments, if desired the spray holes 124 may be calibrated to control the volume of fluid directed to the exposed end windings 105 of the stator 100. For example, in some embodiments the spray holes 124 may be offset toward ends of the spray device 121 to provide additional fluid flow to outer stator windings 105. In some such embodiments, distance between the spray holes 124 defined towards ends of each spray device 121 may be shorter than distance between the spray holes 124 defined towards a central portion of each spray device 121. That is, in such embodiments the spray holes 124 may be closer together toward each end of the spray device 121. However, in some embodiments all of the spray holes of a spray device 121 may be equidistant. Also, in some other embodiments, if desired distance between the spray holes 124 defined towards ends of each spray device 121 may be longer than distance between the spray holes 124 defined towards a central portion of each spray device 121. That is, in such embodiments the spray holes 124 may be farther apart toward each end of the spray device 121.

As another example, in some other embodiments the spray holes 124 may be gauged to control flow of the fluid. In some such embodiments, size of the spray holes 124 defined towards ends of each spray device 121 may be larger than size of the spray holes 124 defined towards a central portion of each spray device 121. That is, in such embodiments the spray holes 124 may be larger toward each end of the spray device 121. However, it will be appreciated that in various other embodiments all of the spray holes of a spray device could be have a same size. It will also be appreciated that, in various embodiments, the spray holes 124 may have any shape whatsoever without limitation, such as, for example, round holes, oblong holes, triangular holes, square holes, rectangular holes, polygonal holes, or any type of hole shape whatsoever, without limitation, as desired for a particular application.

In various embodiments, if desired one or more spray holes (not shown for purposes of clarity) may be defined in the connecting tube 125, and/or in the tube 130 of the spray device assembly 120A, and/or the tube 130 of the spray device assembly 120B and oriented to spray fluid onto the stator 100. It will be appreciated that, in such embodiments, the spray holes in the connecting tube 125, and/or in the tube 130 of the spray device assembly 120A, and/or the tube 130 of the spray device assembly 120B may spray fluid onto portions of the stator 100 other than the exposed end windings 105 of the stator, if desired.

Thus, it will be appreciated that various attributes of the spray holes 124, such as size, shape, distance therebetween, location, and/or number, may depend on various factors, such as, for example, anticipated maximum cooling load to be serviced, anticipated flow requirements, anticipated flow impedance, and/or the like.

As shown in FIG. 3, in various embodiments the spray device 121 includes a shell 122 fluidly couplable to the tube 130 and a shell 123 sealably attachable to the shell 122. In such embodiments, the shell 123 defines therein the spray holes 124. Given by way of illustration only and not of limitation, the shell 122 may be considered an "upper" shell (that is, farther from the axial center of the stator 100) and the shell 123 may be considered a "lower" shell (that is, nearer to the axial center of the stator 100). In various embodiments the shell 122 and the shell 123 may be made of any suitable material as desired for a particular application, such as without limitation a polymer material such as glass filled nylon, metal such as steel like a suitable stainless steel, or the like. It will be appreciated that, in various embodiments, use of polymer material can help contribute to sustaining high thermal loads and high vibration loads.

As discussed above, it will be appreciated that the spray holes 124 may have any size as desired for a particular application. To that end, in various embodiments various shells 123 for a particular application may be provided with spray holes 124 that differ in size from spray holes 124 defined in other shells 123 for other applications. In order to denote readily the size of the spray holes 124 defined in any given shell 123, the shells 123 may be provided with indicia indicative of size of the spray holes 124 defined therein. For example, the shells 123 may be labeled with visual indicia, or may be imparted with a color according to a color code indicative of size of the spray holes 124 defined therein, or the like.

In various embodiments the spray device 121 may be formed by joining the shell 122 to the shell 123. In some such embodiments the shell 122 and the shell 123 may be joined by welding, such as, for example, by vibration welding, ultrasonic welding, laser welding, overmolding, or the like. However, it will be appreciated that the shell 122 and the shell 123 may be joined by any other suitable welding technique, or by adhesives, or by fasteners, or by any other suitable methods of sealably attaching the shell 122 and the shell 123 whatsoever as desired for a particular application. It will also be appreciated that the spray device 121 may be formed as one piece, such as by casting, three-dimensional (3-D) printing, or the like.

In various embodiments, a welding feature (or other mating feature) 181 may be disposed on the shell 123 and configured to engage a welding receiver (or other mating receiver) 182 defined in the shell 122. Various other configurations may be provided for enabling joining of the shell 122 with the shell 123, including but not limited to reversing the depicted configuration by having the welding receiver 182 be defined in the shell 123 and the welding feature 181 being disposed on the shell 122.

Referring additionally to FIGS. 5A and 5B, in various embodiments the connecting tube 125 may be coupled to the spray device assembly 120A and the spray device assembly 120B with a snap feature 103 configured to join the connecting tube 125 to the spray device assembly 120A and the spray device assembly 120B. In such embodiments, each end of the connecting tube 125 includes a snap feature 103 configured to join the connecting tube 125 to the spray device assembly 120A and the spray device assembly 120B via snap-fit by force in a direction along the axis of the connecting tube 125.

In some such embodiments the snap feature 103 may be formed internal to the connecting tube 125 to retain a snap lever 104. It will be appreciated that disposing the snap feature 103 on the inside of the connecting tube 125 can help prevent material from entering an electric motor if the snap feature 103 were to break.

In some such embodiments the snap feature 103 may be configured to align the connecting tube 125 and an associated spray device assembly 120A or 120B. For example, if desired a piloting feature 107 (FIG. 5B) may be configured to engage the connecting tube 125, thereby helping to contribute to providing increased rigidity, reduced load on snap, and improved handling at assembly.

In some other such embodiments the snap feature 103 may be configured to help contribute to preventing rotation between the connecting tube 125 and an associated spray device assembly 120A or 120B. For example, the piloting feature 107 may help contribute to preventing rotation between the connecting tube 125 and the spray device assembly 120A and between the connecting tube 125 and the spray device assembly 120B. It will be appreciated that such embodiments also can help contribute to aligning the spray devices 121.

In various embodiments, if desired an O-ring 108 (FIG. 5A) may be provided to help aid in reducing or preventing leakage of fluid.

With the structure as shown in FIGS. 5A and 5B and with like structures, snap together pre-assembly of the sprayer assembly 110 may be enabled and may also help facilitate installation from one side of an electric motor, thereby helping to contribute to improving the assembly process.

However, it will be appreciated that the connecting tube 125 may be coupled to the spray device 121 in any suitable manner as desired for a particular application, such as, without limitation, attaching with fasteners, welding such as laser welding or the like, press-fitting, overmolding, or the like. It will also be appreciated that, in some embodiments, when provided the snap tube 103 may be disposed on the outside of the tube 125 as desired for a particular application.

It will also be appreciated that, in some embodiments, if desired the sprayer assembly 110 may be provided as one piece. That is, in such embodiments the spray device assembly 120A, the spray device assembly 120B, and the connecting tube 125 may be made as one piece, such as, for example, by molding or the like.

As shown in FIGS. 1, 2, 3, and 4, in various embodiments the spray device 121 includes a mounting tab 150 that defines an aperture 152 (FIG. 3) formed therethrough (for example, in a direction parallel to the axial center of the stator 100) and that may be used for mounting the spray device 121 to any of a variety of structures, such as without limitation a housing or cover for an electric motor, or a housing, cover, or structure associated with a component of an electric motor assembly, or the like. In some such embodiments, a compression limiter 154 may be disposed concentrically within the aperture 152. In such embodiments, it will be appreciated that the compression limiter 154 can help contribute to reducing and/or preventing crushing of plastic material used to make the mounting tab 150 (if applicable) and/or can help reduce loss of torque imparted by a fastener received therethrough (not shown). In various embodiments, it will be appreciated that a fastener (not shown for purposes of clarity) received in the aperture 152 and the compression limiter 154 is axially aligned with the spray assembly 110 (that is, parallel with the connecting tube 125 and the tubes 130).

In various embodiments and as shown in FIGS. 1 and 2, it will be appreciated that, due to a reverse orientation of the spray device assemblies 120A and 120B relative to each other in the sprayer assembly 110, the mounting tab 150 of the spray device assembly 120A and the mounting tab 150 of the spray device assembly 120B are on different sides of centerline of the spray assembly 110.

Figure 6A:
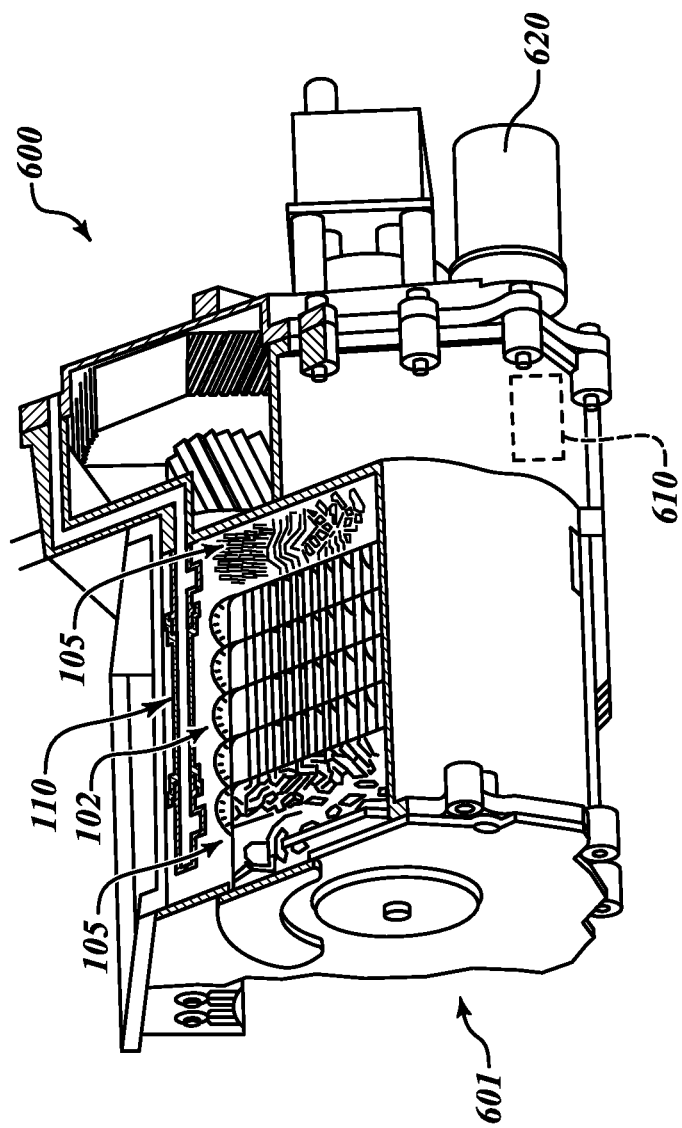
FIG. 6A is a perspective view of an illustrative electric motor assembly with the sprayer assembly of FIG. 1.
Figure 6B:
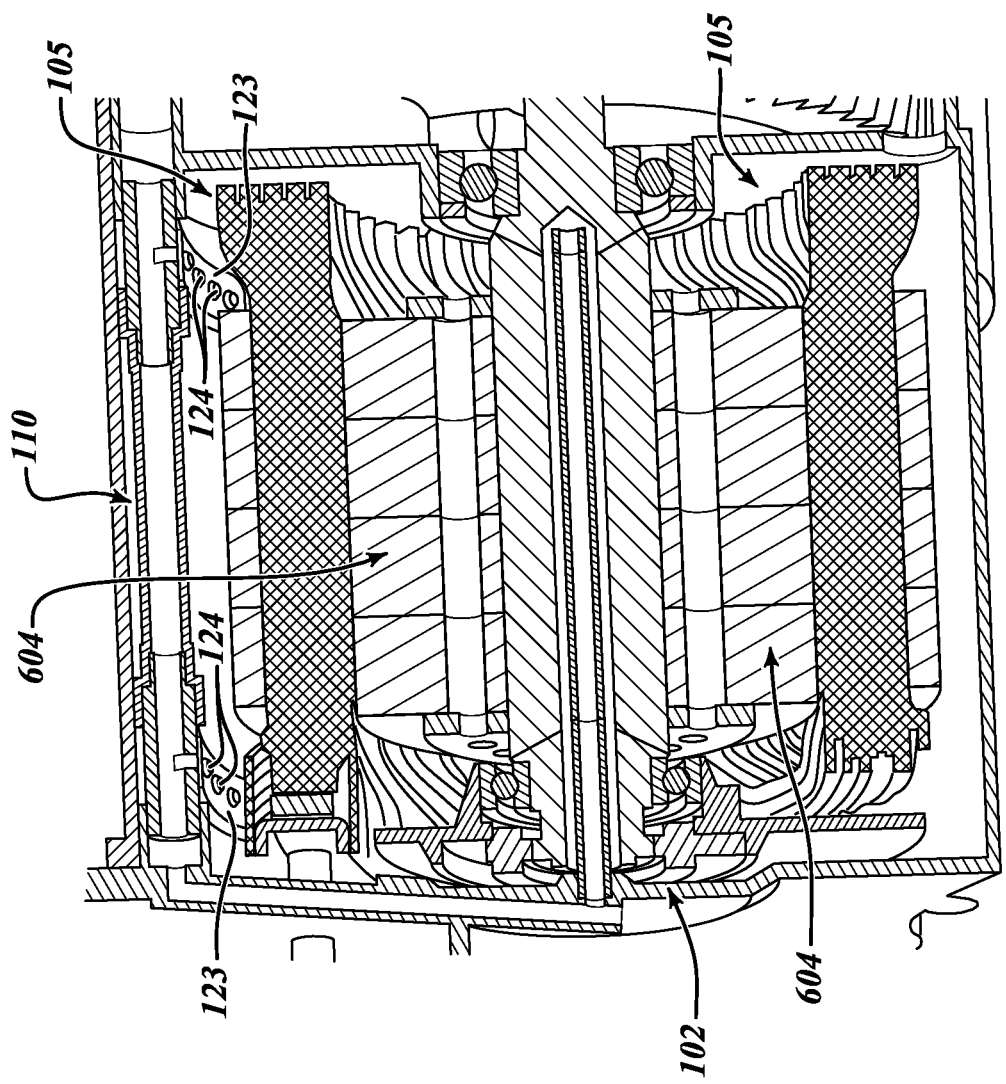
FIG. 6B is a perspective view of details of the electric motor assembly of FIG. 6A.

Referring additionally to FIGS. 6A and 6B, in various embodiments the sprayer assembly 110 may be used to cool the stator windings 105 of an electric motor 102. It will be appreciated that the sprayer assembly 110 may be used to cool the stator windings 105 of any electric motor whatsoever for any purpose and/or application whatsoever as desired without any limitation.

To that end, in various embodiments the sprayer assembly 110 may be used to cool the stator windings 105 of an electric motor 102 that is part of an illustrative electric motor assembly 600. In various embodiments the electric motor assembly 600 includes a housing 601. The electric motor 102 is disposed in the housing 601. The electric motor 102 includes a rotor 604 and the stator 100. The sprayer assembly 110 is configured spray fluid onto the exposed end windings of the stator 100. The oil sprayer assembly 110 has been described above and, for sake of brevity, details of its construction and operation are not repeated (and need not be repeated for an understanding by a person of skill in the art).

The electric motor 102 may be any type of electric motor as desired for a particular application. For example, the electric motor 102 may be any type of alternating current (AC) motor or any type of direct current (DC) motor. AC motors and DC electric motors are extremely well known and no further description of their construction or operation is necessary for an understanding of disclosed subject matter by a person of skill in the art.

In various embodiments the electric motor assembly 600 may include a fluid reservoir 610, such as a sump (shown in phantom). In some such embodiments the sprayer assembly 110 is fluidly couplable to the fluid reservoir 610. In some such embodiments the fluid reservoir 610 may be disposed within the housing 601, such as without limitation within a lower region of the housing 601. In such embodiments the fluid reservoir 610 may be configured as a fluid source.

In various embodiments the electric motor assembly 600 may include a fluid pump 620 configured to pump fluid from the fluid reservoir 610 to the sprayer assembly 110 and through the sprayer assembly 110. As described above, the fluid (pumped by the fluid pump 620) flows through the spray assembly 110 and sprays from the spray holes 124. It will be appreciated that, in various embodiments, fluid that is sprayed from the spray holes 124 (onto the exposed end windings 105 of the stator 100 or onto other portions of the stator 100) returns to the reservoir 610 (such as, for example, by gravity draining).

It will be appreciated that, in various embodiments, the fluid pump 620 and its associated sprayer assembly 110 are fluidly coupled by any suitable piping, tubing, fluid flow channels, or the like (not shown for purposes of clarity) for a particular application. In various embodiments, if desired fluid pumped by the fluid pump 620 may be used for other, additional cooling purposes before entering the spray device assembly 120A and/or (if applicable) after exiting the spray device assembly 120B.

The fluid pump 620 may be any suitable type of fluid pump as desired, such as without limitation an electric pump or a hydraulic pump. Fluid pumps are well known and details of their construction and operation are not necessary for an understanding of disclosed subject matter by a person of skill in the art. It will be appreciated that fluid distribution is independent of speed of the rotor 604 because fluid pressure is provided by the fluid pump 620.

It will be appreciated that the sprayer assembly 110 may be used to cool the stator windings 105 of any electric motor whatsoever for any purpose and/or application whatsoever as desired without any limitation. In the interest of brevity, a non-limiting example of such an application is set forth below by way of illustration only and not of limitation of the sprayer assembly 110 cooling an electric motor in an electric vehicle or a hybrid vehicle. However, it will be appreciated that no such limitation of applicability of the sprayer assembly 110 is intended and no such limitation is to be inferred. Instead, it is emphasized that the sprayer assembly 110 may be used to cool any electric motor whatsoever as desired for any application at all.

Figure 7:
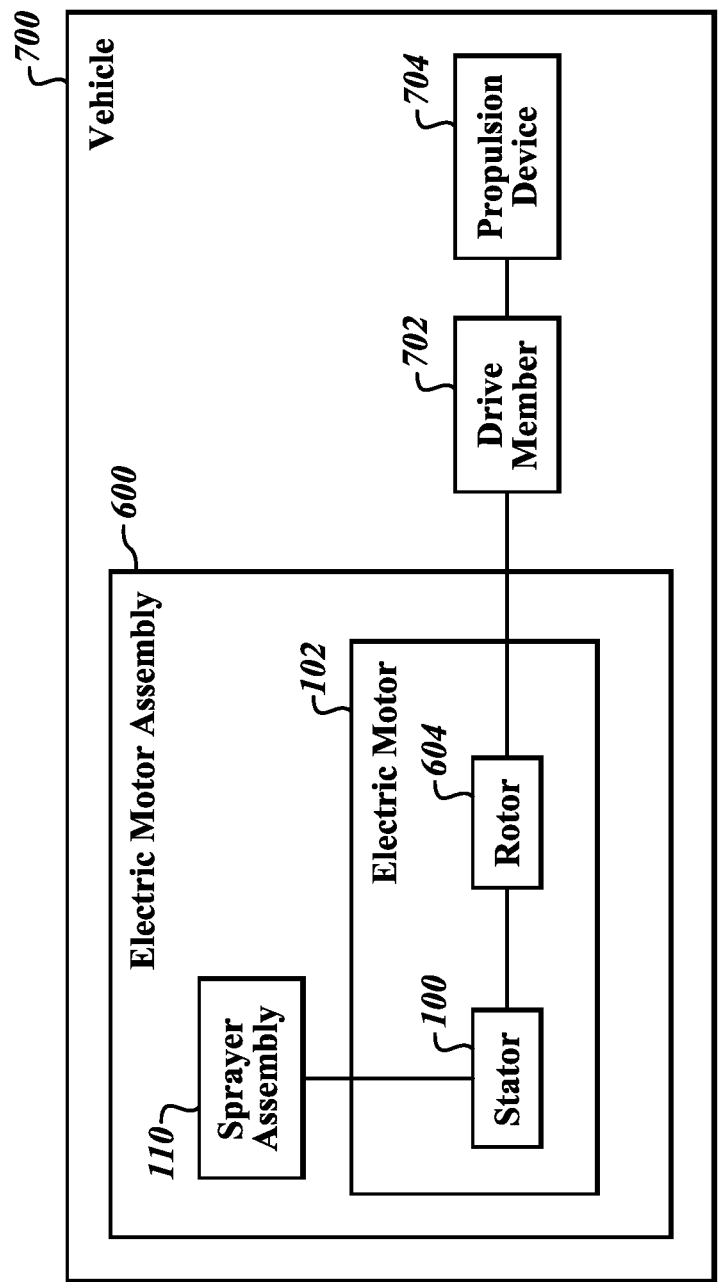
FIG. 7 is a block diagram of an illustrative vehicle.

Referring additionally to FIG. 7, in various embodiments an illustrative vehicle 700 includes at least one drive member 702. At least one propulsion device 704 is coupled to the at least one drive member 702. At least one electric motor assembly 600 includes a housing 601. An electric motor 102 is disposed in the housing. The electric motor 102 includes a stator 100 having exposed end windings and a rotor 604 configured to rotate relative to the stator 100. The rotor 604 is coupled to the at least one drive member 702. A sprayer assembly 110 is configured spray fluid onto the exposed end windings of the stator 100. Details of the electric motor assembly 600, the electric motor 102, the rotor 604, the stator 100, and the spray assembly 110 have been described above and, for sake of brevity, details of their construction and operation are not repeated (and need not be repeated for an understanding by a person of skill in the art).

It will be appreciated that the vehicle 700 can be any type of vehicle whatsoever as desired without limitation. Given by way of non-limiting example, in various embodiments the vehicle 700 may be an electric vehicle (that is, an all-electrically driven vehicle) or a hybrid vehicle. For example and given by way of non-limiting examples, in various embodiments the vehicle 700 may include a motor vehicle driven by wheels and/or tracks, such as, without limitation, an automobile, a truck, a sport utility vehicle (SUV), a van, an all-terrain vehicle (ATV), a motorcycle, an electric bicycle, a tractor, a lawn mower such as without limitation a riding lawn mower, a snowmobile, and the like. Given by way of further non-limiting examples, in various embodiments the vehicle 700 may include a marine vessel such as, without limitation, a boat, a ship, a submarine, a submersible, an autonomous underwater vehicle (AUV), and the like. Given byway of further non-limiting examples, in various embodiments the vehicle 700 may include an aircraft such as, without limitation, a fixed wing aircraft, a rotary wing aircraft, and a lighter-than-air (LTA) craft.

In various embodiments the electric motor (or motors) 102 are configured to drive the vehicle 700. That is, in various embodiments the electric motor (or motors) 102 may drive any drive member 702 that drives any propulsion device 704, such as without limitation a wheel or wheels, a track or tracks, a propellor or propellors, a propulsor or propulsors, a rotor or rotors, or the like, associated with the vehicle 700.

For example, in some embodiments in a motor vehicle one electric motor 102 may be configured to drive one drive member 702 such as an axle or a chain ring that drives one wheel or track, in some other embodiments in a motor vehicle one electric motor 102 may be configured to drive an axle that rotates two wheels or two tracks, and in some other embodiments in a motor vehicle one electric motor 102 may be configured to drive an axle that rotates one wheel or one track and another motor configured to drive another axle that rotates another wheel or another track.

Similarly, in some embodiments in a marine vessel one electric motor 102 may be configured to drive one propeller or propulsor, in some other embodiments in a marine vessel one electric motor 102 may be configured to drive a shaft that rotates two propellers or two propulsors, and in some other embodiments in a marine vessel one electric motor 102 may be configured to drive a shaft that rotates one propeller or propulsor and another electric motor 102 may be configured to drive another shaft that rotates another propeller or propulsor.

Likewise, in some embodiments in an aircraft one electric motor 102 may be configured to drive one propeller or rotor, in some other embodiments in an aircraft one electric motor 102 may be configured to drive a shaft that rotates two propellers or two rotors, and in some other embodiments in an aircraft one electric motor 102 may be configured to drive a shaft that rotates one propeller or rotor and another electric motor 102 may be configured to drive another shaft that rotates another propeller or rotor.

In some instances, one or more components may be referred to herein as "configured to," "configured by," "configurable to," "operable/operative to," "adapted/adaptable," "able to," "conformable/conformed to," etc. Those skilled in the art will recognize that such terms (for example "configured to") generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (for example, "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (for example, the device recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While the disclosed subject matter has been described in terms of illustrative embodiments, it will be understood by those skilled in the art that various modifications can be made thereto without departing from the scope of the claimed subject matter as set forth in the claims.

What is claimed is:

1. A sprayer assembly comprising:
a first spray device assembly configured to receive a fluid and further configured to spray the fluid therefrom;
a second spray device assembly configured to receive the fluid and further configured to spray the fluid therefrom; and
a connecting tube fluidly couplable to the first spray device assembly and the second spray device assembly and configured to provide the fluid from the first spray device assembly to the second spray device assembly.

2. The sprayer assembly of claim 1, wherein each of the first and second spray device assemblies includes a tube defining an external connection port and a connecting tube connection port.

3. The sprayer assembly of claim 1, wherein each of the first and second spray device assemblies includes a spray device defining a plurality of spray holes configured to spray the fluid therefrom.

4. The sprayer assembly of claim 3, wherein distance between ones of the plurality of spray holes defined towards ends of each spray device is shorter than distance between ones of the plurality of spray holes defined towards a central portion of each spray device.

5. The sprayer assembly of claim 3, wherein size of ones of the plurality of spray holes defined towards ends of each spray device is larger than size of ones of the plurality of spray holes defined towards a central portion of each spray device.

6. The sprayer assembly of claim 3, wherein the spray device includes:

a first shell fluidly couplable to the tube; and a second shell sealably attachable to the first shell, the second shell defining therein the plurality of spray holes.

7. The sprayer assembly of claim 1, wherein each end of the connecting tube includes a snap feature configured to join the connecting tube to the first spray device assembly and the second spray device assembly.

8. The sprayer assembly of claim 7, wherein the snap feature is further configured to align the connecting tube and an associated spray device assembly.

9. The sprayer assembly of claim 7, wherein the snap feature is further configured to prevent rotation between the connecting tube and an associated spray device assembly.

10. An electric motor assembly comprising:
a housing;
an electric motor disposed in the housing, the electric motor including:
a stator having exposed end windings; and
a rotor configured to rotate relative to the stator;
a sprayer assembly configured spray fluid onto the exposed end windings of the stator; and
a fluid reservoir, the sprayer assembly being fluidly couplable to the fluid reservoir.

11. The electric motor assembly of claim 10, wherein the sprayer assembly includes:
a first spray device assembly configured to receive a fluid and further configured to spray the fluid therefrom;
a second spray device assembly configured to receive the fluid and further configured to spray the fluid therefrom; and
a connecting tube fluidly couplable to the first spray device assembly and the second spray device assembly and configured to provide the fluid from the first spray device assembly to the second spray device assembly.

12. The electric motor assembly of claim 11, wherein each of the first and second spray device assemblies includes a tube defining an external connection port and a connecting tube connection port.

13. The electric motor assembly of claim 11, wherein each of the first and second spray device assemblies includes a spray device defining a plurality of spray holes configured to spray the fluid therefrom.

14. The electric motor assembly of claim 13, wherein distance between ones of the plurality of spray holes defined towards ends of each spray device is shorter than distance between ones of the plurality of spray holes defined towards a central portion of each spray device.

15. The electric motor assembly of claim 13, wherein size of ones of the plurality of spray holes defined towards ends of each spray device is larger than size of ones of the plurality of spray holes defined towards a central portion of each spray device.

16. The electric motor assembly of claim 13, wherein each spray device includes:
a first shell fluidly couplable to the tube; and
a second shell sealably attachable to the first shell, the second shell defining therein the plurality of spray holes.

17. The electric motor assembly of claim 10, further comprising:
a fluid pump configured to pump fluid from the fluid reservoir to the sprayer assembly and through the sprayer assembly.

18. A vehicle comprising:
at least one drive member;
at least one propulsion device coupled to the at least one drive member;
at least one electric motor assembly including:
a housing;
an electric motor disposed in the housing, the electric motor including:
a stator having exposed end windings; and
a rotor configured to rotate relative to the stator, the rotor being coupled to
the at least one drive member;
a sprayer assembly configured spray fluid onto the exposed end windings of the stator; and
a fluid reservoir, the sprayer assembly being fluidly couplable to the fluid reservoir.

19. The vehicle of claim 18, wherein the electric motor assembly further includes a fluid pump configured to pump fluid from the fluid reservoir to the sprayer assembly and through the sprayer assembly.

* * * * *